(12) United States Patent
Brusilovsky

(10) Patent No.: US 8,989,806 B2
(45) Date of Patent: Mar. 24, 2015

(54) NETWORK OPERATOR-NEUTRAL PROVISIONING OF MOBILE DEVICES

(75) Inventor: Alec Brusilovsky, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 23 days.

(21) Appl. No.: 13/610,038

(22) Filed: Sep. 11, 2012

(65) Prior Publication Data

US 2013/0157673 A1 Jun. 20, 2013

Related U.S. Application Data

(60) Provisional application No. 61/535,606, filed on Sep. 16, 2011.

(51) Int. Cl.
| | |
|---|---|
| *H04M 1/00* | (2006.01) |
| *H04W 72/04* | (2009.01) |
| *H04W 8/26* | (2009.01) |
| *H04W 12/02* | (2009.01) |
| *H04W 12/06* | (2009.01) |
| *H04W 8/18* | (2009.01) |
| *H04W 8/20* | (2009.01) |
| *H04W 88/06* | (2009.01) |

(52) U.S. Cl.
CPC .............. *H04W 72/04* (2013.01); *H04W 8/265* (2013.01); *H04W 12/02* (2013.01); *H04W 12/06* (2013.01); *H04W 8/183* (2013.01); *H04W 8/205* (2013.01); *H04W 88/06* (2013.01)
USPC ...................... 455/552.1; 455/410; 455/414.2; 455/558; 455/456.6

(58) Field of Classification Search
CPC ...... H04W 8/265; H04W 12/02; H04W 8/183
USPC .............. 455/410, 414.2, 456.6, 550.1, 552.1, 455/558
See application file for complete search history.

(56) References Cited

U.S. PATENT DOCUMENTS

| | | | |
|---|---|---|---|
| 8,516,133 B2 * | 8/2013 | Smeets et al. ................. | 709/228 |
| 2010/0311404 A1 | 12/2010 | Shi et al. | |
| 2011/0035584 A1 * | 2/2011 | Meyerstein et al. .......... | 713/155 |
| 2012/0276872 A1 * | 11/2012 | Knauth et al. ................ | 455/411 |

FOREIGN PATENT DOCUMENTS

| | | |
|---|---|---|
| GB | 2473753 A | 3/2011 |
| WO | 2009/103623 A2 | 8/2009 |
| WO | 2010/102236 A2 | 9/2010 |

OTHER PUBLICATIONS

3rd Generation Partnership Project: 3GPP TS. 23.122 v10.4.0, "Non-Access-Stratum (NAS) Functions Related to Mobile Station (MS) in Idle Mode (Release 10)," Jun. 2011, 44 pages.
3rd Generation Partnership Project: 3GPP TS. 23.203 v8.12.0, "Policy and Charging Control Architecture (Release 8)," Jun. 2011, 115 pages.
3rd Generation Partnership Project: 3GPP TS. 23.402 v10.4.0, "Architecture Enhancements for Non-3GPP Accesses (Release 10)," Jun. 2011, 231 pages.
3rd Generation Partnership Project: 3GPP TR 33.812 vo.1.0, "Feasibility Study on Remote Management of USIM Application on M2M Equipment (Release 8)," Jan. 2008, 16 pages.

* cited by examiner

*Primary Examiner* — Tuan Pham
(74) *Attorney, Agent, or Firm* — Ryan, Mason & Lewis, LLP

(57) ABSTRACT

Techniques are disclosed for provisioning mobile devices in a network operator-neutral manner in communication networks. For example, a method comprises a mobile device that is operator neutral attaching to a first operator network, and the operator neutral mobile device establishing a provisioning bearer in the first operator network.

21 Claims, 4 Drawing Sheets

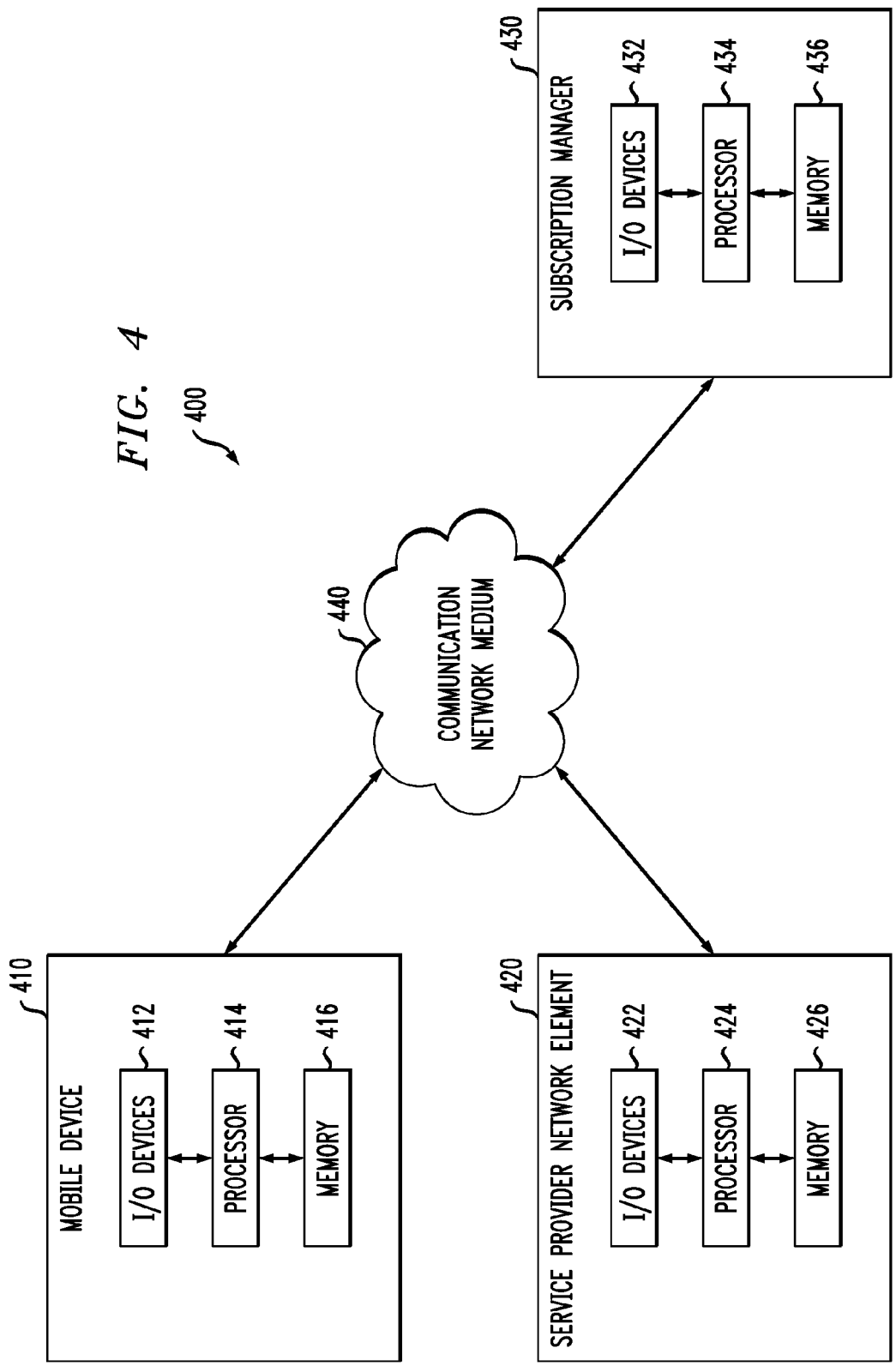

NETWORK OPERATOR-NEUTRAL PROVISIONING OF MOBILE DEVICES

CROSS REFERENCE TO RELATED APPLICATION

The present application claims priority to the U.S. Provisional Application identified as Ser. No. 61/535,606, filed on Sep. 16, 2011, and entitled "Method for Obtaining Network Connectivity for Bootstrapping Subscription Credentials into an Operator-Neutral Manner," the disclosure of which is incorporated by reference herein in its entirety.

FIELD

The present application relates generally to communication networks and, more particularly, to techniques for provisioning mobile devices in an operator-neutral manner.

BACKGROUND

Currently, a mobile device is typically provisioned with a subscription profile for a specific network operator, e.g., AT&T, Verizon, Sprint, etc., before it is purchased by a subscriber. In current cellular network operation, the subscription profile includes an International Mobile Subscription Identity (IMSI), typically a 15 digit number of which the 3 left-most digits identify the country of operation, and the next 2 (or 3) digits identify the Mobile Network Operator (MNO) that owns this subscription. The rest of the digits (9 or 10 digits) identify the subscription itself within the realm of the operator-owner. Therefore, each subscription is network operator-specific.

In order to load a subscription profile on a mobile device, a subscriber identification module (SIM) is installed in the user equipment (UE). That is, the SIM has the subscription profile already provisioned specifying the network operator with which the mobile device will operate. In addition to storing the subscription profile, a SIM may also typically contain other information such as, but not limited to, a shared secret and a set of functions for executing device/network mutual authentication.

It is known that SIMs installed in some mobile devices are designed to be removable, while others are intended to be non-removable. A SIM that is non-removable is typically said to be embedded in the mobile device.

When a SIM is embedded in the mobile device, it has to be provisioned with the subscription profile, and any other information, either at the facility of the device manufacturer, at a facility of the network operator, or through remote "over the air" provisioning procedures deployed by the network operator.

SUMMARY

Embodiments of the invention provide techniques for provisioning mobile devices in a network operator-neutral manner in communication networks.

For example, in one embodiment, a method comprises a mobile device that is operator neutral attaching to a first operator network, and the operator neutral mobile device establishing a provisioning bearer in the first operator network.

The establishment of the provisioning bearer further may comprises the operator neutral mobile device establishing a secure session using the provisioning bearer, and the operator neutral mobile device being provisioned over the secure provisioning bearer. The operator neutral mobile device may be provisioned via the provisioning bearer for a second operator network. In one example, the operator neutral mobile device comprises a subscriber identification module that is missing at least part of a subscription profile.

In another embodiment, an apparatus comprises a processor coupled to the memory and configured to perform the above-mentioned steps for the given method.

In a yet another embodiment, an article of manufacture comprises a processor-readable storage medium that stores one or more software programs which when executed by a processor perform the above-mentioned steps for the given method.

In a further embodiment, a system comprises a mobility management entity configured to attach an operator neutral mobile device to a first network, and a service management entity configured to provision the attached mobile device through a secure bearer.

Advantageously, illustrative embodiments of the invention provide for mobile devices that are network operator-neutral to be deployed in a given environment, and then to be provisioned via a dedicated provisioning bearer in order that the mobile device is able to operate with one or more network operators.

These and other features and advantages of the present invention will become more apparent from the accompanying drawings and the following detailed description.

BRIEF DESCRIPTION OF THE DRAWINGS

FIG. 4 is a diagram illustrating an architecture suitable for implementing a network operator-neutral mobile device provisioning methodology, according to an embodiment of the invention.

DETAILED DESCRIPTION

Figure 1:
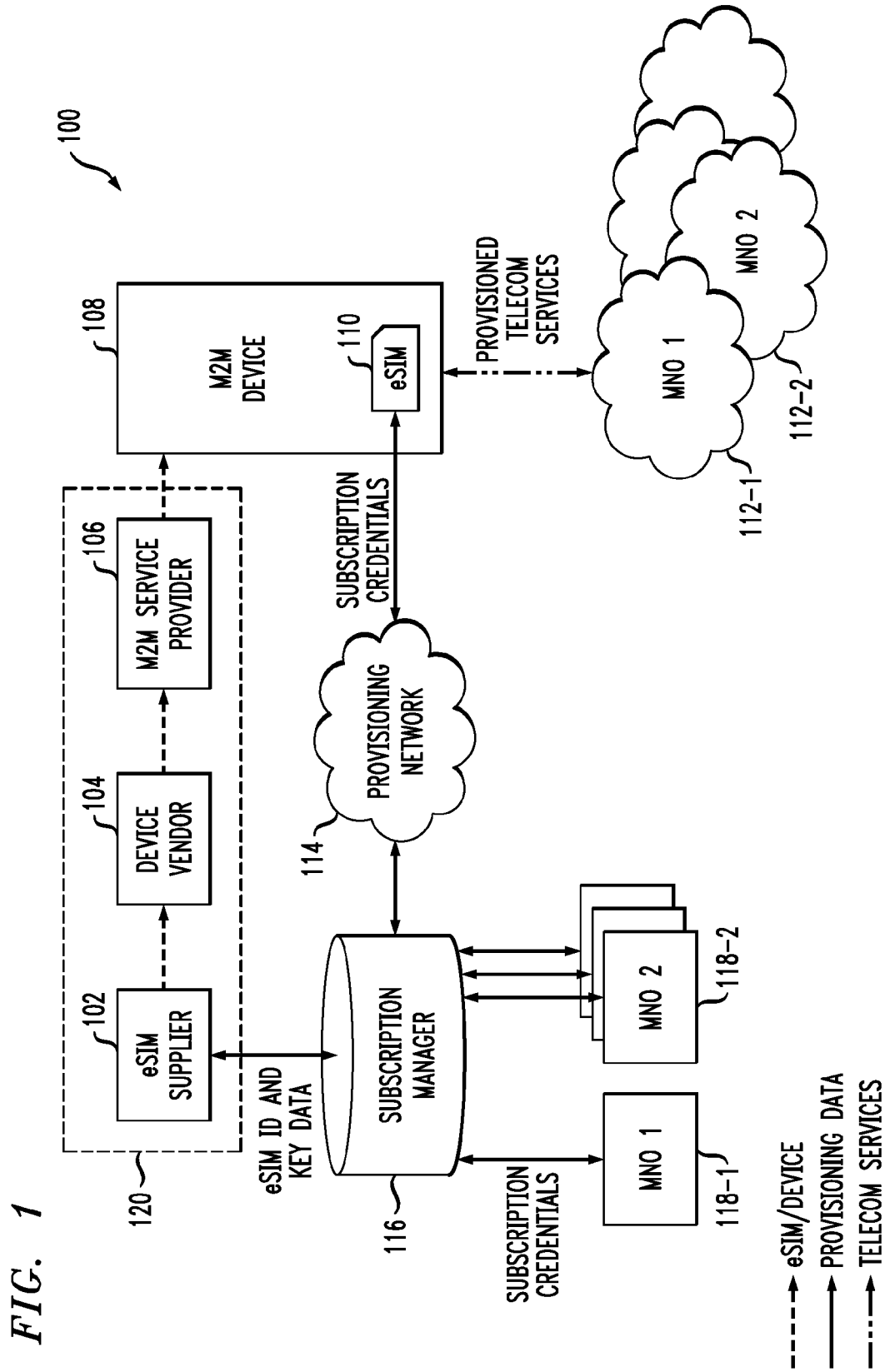
FIG. 1 is a diagram illustrating a provisioning architecture associated with M2M devices in accordance with which embodiments of the invention may be implemented.

Embodiments of the invention will be described below in the context of illustrative communication protocols and network architectures. However, it is to be appreciated that embodiments of the invention are not limited to any particular communication protocols or network architectures. Rather, embodiments of the invention are applicable to any suitable communication environment where it would be desirable to provide improved provisioning of mobile devices.

For the purpose of this description, the term SIM includes subscriber identity modules denoted differently in various standards, that is, User Identity Module (UIM) and its removable counterpart R-UIM; SIM application used for the second generation (2G) authentication technology defined by the GSM Association; USIM application used for the third and fourth generation (3G and 4G) authentication technologies defined by the Third Generation Partnership Project (3GPP), the ISIM application used for the IMS Authentication technology defined by the 3GPP; the CSIM application used for the third (3G) authentication technology based on CDMA2000 standard defined by the Third Generation Partnership Project 2 (3GPP2); and the UICC—the Universal Integrated Circuit Card—containing the above mentioned authentication applications.

The phrase "communication network" as used herein is generally defined as any communication network or system capable of transporting one or more types of media including, but not limited to, voice-based data, video-based data, text-based data, and graphics-based data.

The phrase "mobile device" as used herein is generally defined as a mobile computing and/or communication device associated with a subscriber entity. Examples of mobile devices include, but not limited to, a cellular phone, a smart phone, a tablet, a personal digital assistant, a laptop computer, etc. Note also that, in other embodiments, a mobile device may be a machine-to-machine (M2M) device or a machine type communication (MTC) device. Examples of these types of devices include, but are not limited to, sensors, location tags, machines, monitors, meters, etc.

M2M devices can enable many different types of applications. By way of only a few examples, application-specific M2M devices may include, but are not limited to, health monitors, utility management meters, fleet management tags, vending machines, and point-of-sale terminals. M2M devices can operate over a publicly-accessible wide area communication network such as a cellular network operated by a cellular network operator (by way of example only, Verizon, AT&T or Sprint). However, as with cellular or smart phones, M2M devices also need to be provisioned with some initial subscription profile in order to operate with a particular network operator.

As will be illustratively referred to herein, the following acronyms have the following meanings:

UICC stands for UMTS (Universal Mobile Telecommunication System) Integrated Circuit Card;

USIM stands for UMTS Subscriber Identification Module, which is a software component residing on the UICC hardware platform;

MS stands for Mobile Station;

ME stands for Mobile Equipment; and

UE stands for User Equipment, where a UE is typically considered to be a combination of an ME and a USIM.

It is to be understood that the acronyms ME, MS and UE may be used to refer to a mobile device (e.g., a cellular phone, a M2M device, or other).

Note also that an eUICC and an eUSIM respectively denote an embedded UICC and an embedded USIM (embedded meaning that they are not intended to be removable from the mobile device once installed).

As will be explained in detail herein, embodiments of the invention are directed to provisioning embedded network operator-neutral SIMs/UICCs (eSIMs/eUICCs) of mobile devices. Provisioning includes providing data in the mobile device including, but not limited to, subscription and/or subscriber profile information, shared secret information, data used for executing device/network mutual authentication, network connectivity coverage information, temporary network coverage information, etc. Advantageously, provisioning can occur without previous provisioning of an operator network.

Thus, "network operator-neutral" describes a mobile device that does not have stored thereon some or all of the above-noted subscriber/subscription-related information, e.g., in particular, it is missing an initial user subscriber/subscription profile specifying the network operator with which the mobile device will operate (e.g., parts of the IMSI that identify the MNO and/or aspects of the subscription itself). Network operator-neutral may also be referred to as "network operator-independent" and the like.

As mentioned above, existing approaches require mobile devices with embedded SIMs to be pre-provisioned at the facility of either the device manufacturer, the SIM supplier, or the network operator. While one may consider the possibility of provisioning a mobile device "over the air" (OTA), current state of the art technology and 3GPP standards require initial connectivity to be established using an initial user subscription profile. Thus, current OTA provisioning would still not enable the realization of network operator-neutral mobile devices.

Embodiments of the invention allow devices with initially neutral eSIMs/eUICCs to obtain network connectivity for bootstrapping security sessions to load their initial or subsequent subscription profiles. This can allow the manufacturers of the network elements with eSIMs/eUICCs to be able to lower the initial cost of the devices by using economy of scale to produce operator/locale-neutral devices. The mobile device may thus subsequently be provided with identification and security information. For example, the identification data can be a unique identifier (id) for the specific eSIM/eUICC (e.g., UICC id) and the security information can include shared secrets, certificates, and/or other types of security data (e.g., authentication and key generation functions, etc.). The identification information can also include an IMSI or parts thereof.

By way of example, assume that an M2M device produced in an operator-neutral manner, in accordance with one or more embodiments of the invention, is shipped to M2M provider A. Advantageously, upon power-up, this device establishes a bootstrap bearer with operator A, uses that bearer to access a subscription manager (SM), uses bootstrap credentials (e.g., pre-shared secret, certificate, etc.) to establish bootstrapping session security with the SM, and uses that security information to download a set of eSIM/eUICC credentials and/or a subscription profile for operator B. Upon the subsequent disconnect from the SM and the bootstrapping bearer from operator A, the M2M device is ready to be normally connected with operator B.

Still further, it is realized that M2M deployments make the existing pre-provisioned subscription approach non-scalable considering that, in such networks, there may be a very large number of M2M devices (with each device having no user interface thereon) manufactured and distributed without any affiliation with the mobile operator. Consider a scenario, for example, with thousands (if not millions) of water meters that are built by a factory in Taiwan and stored at a plumbing parts distributor warehouse, along with valves, spigots, and other plumbing items, until they are purchased by a water supply company in a small town in Bulgaria. At that time, the M2M device in the water meter needs to be associated with the local Mobile Network Operator (in Bulgaria) and provisioned with subscription credentials including IMSI, etc. Hence, establishing an operator-neutral bootstrapping bearer to conduct this provisioning in accordance with embodiments of the invention is quite advantageous.

FIG. 1 is a diagram illustrating a proposed provisioning architecture associated with M2M devices in accordance with which embodiments of the invention may be implemented. In particular, architecture 100 depicts multiple provisioning arrangements. As shown, the architecture 100 includes an eSIM supplier 102, a device vendor 104, an M2M service provider 106, an M2M device 108, an eSIM 110, mobile network operators (MNO) 112-1 and 112-2, a provisioning network 114, a subscription manager 116, and subscription credentials for MNO 1 (118-1) and MNO 2 (118-2).

In the architecture 100 of FIG. 1, M2M device 108 contains eSIM 110 stored on an eUICC (not expressly shown in FIG. 1). This eUICC can contain multiple eSIMs, each with its own profile. For instance, there could be profiles for multiple MNOs (112-1, 112-2), banks, golf course memberships, vehicle manufacturers, utilities, etc., associated with the same multi-purpose M2M device.

Access to all these profiles is guarded by the security management layer in the eUICC, placed below the profiles. This layer is controlled by subscription manager (SM) 116, an entity in the network (e.g., in the cloud infrastructure) that has trust relations with the profile owners, e.g., MNOs, etc. The content of the profiles (shown as subscription credentials 118-1, 118-2 in FIG. 1) are provisioned via the provisioning network 114.

Alternatively and orthogonally to this, some profiles can be pre-provisioned into the eSIM at the factory through the eSIM supplier 102, device vendor 104, and on the specific order of the M2M service provider 106. This alternative provisioning (denoted by box 120 shown at the top of FIG. 1) is the existing pre-provisioning approach that embodiments of the invention seek to improve upon. However, without the implementation of an embodiment of the invention, the other provisioning approach outlined in FIG. 1, where subscription credentials are provided to the M2M device, would still require the M2M to have some initial basic subscription profile so that it can attach to the provisioning network 114. Embodiments of the invention overcome this limitation by providing a dedicated provisioning bearer service or session.

It is realized that 3GPP Technical Specification (TS) 23.122, clause 2 states: If the MS is unable to find a suitable cell to camp on, or the SIM is not inserted, or if it receives certain responses to a location request (LR) (e.g., "illegal MS"), it attempts to camp on a cell irrespective of the public land mobile network (PLMN) identity, and enters a "limited service" state in which it can only attempt to make emergency calls. Even if the SIM (or eSIM/eUICC) is physically present in the terminal, the mobile equipment ME of that UE can be programmed to respond to the network in a way which would provoke its being in a limited service state (LSS). For example, the mobile may present an unusable International Mobile Subscriber Identifier (IMSI) to the serving network. Upon the serving network being unable to interpret the IMSI, the serving network will place the mobile in the LSS.

Traditionally, per local regulations, mobiles in LSS are able to make only Emergency Calls (EC) and are forced into specialized EC data paths. Illustrative embodiments of the invention advantageously adapt this approach for obtaining network connectivity in order to bootstrap an initial/new subscription profile to an operator-neutral eSIM/eUICC.

For example, according to illustrative embodiments, UEs that obtain network connectivity and are in a limited service state can initiate an attach procedure with an indication that the attach is to bootstrap service for loading subscription profile(s) and/or provisioning. The network supporting such a bootstrap service for UEs in a limited service state can provide bootstrap bearer services to these UEs.

Figure 2:
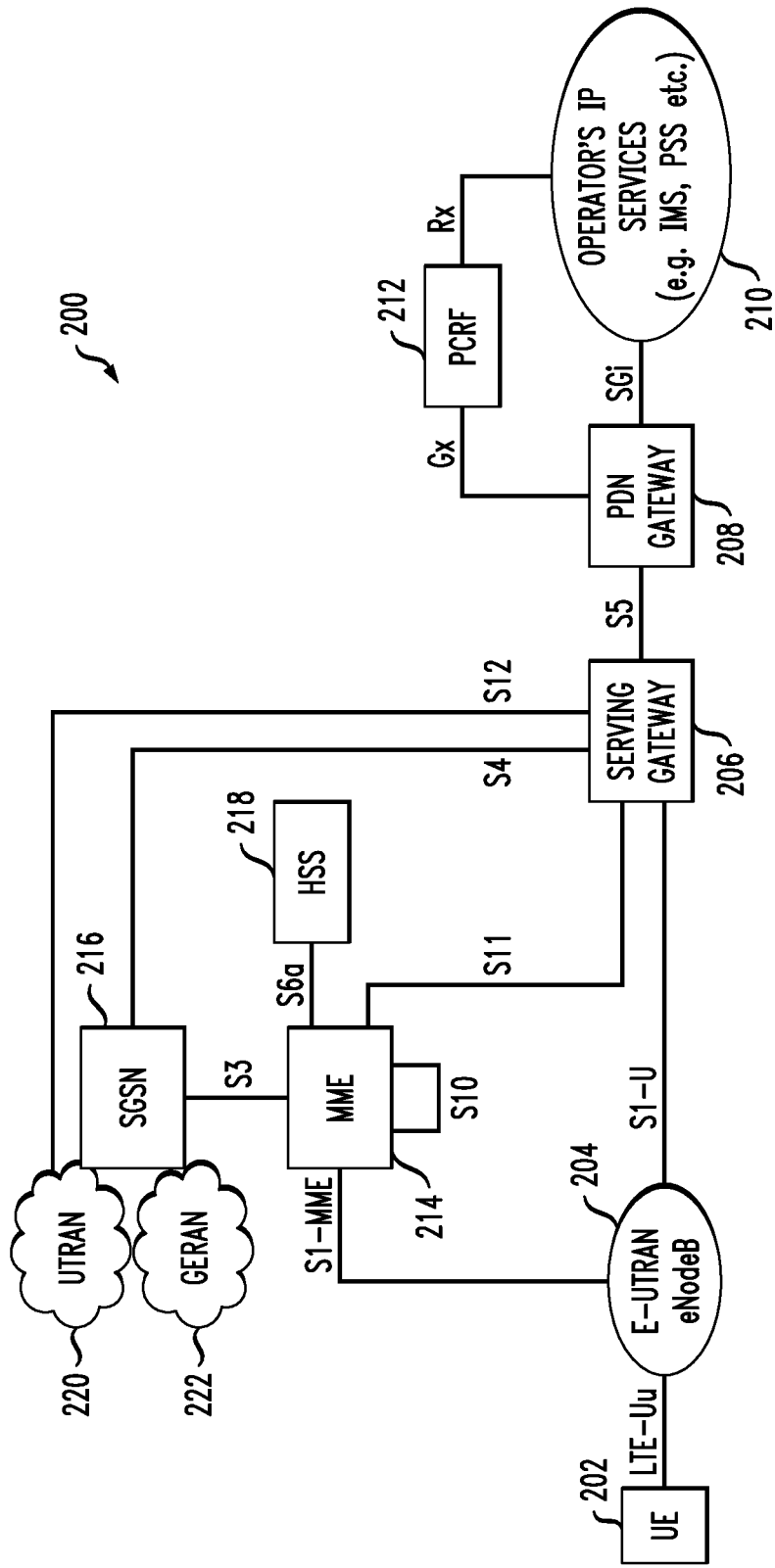
FIG. 2 is a diagram illustrating a communication network architecture, according to an embodiment of the invention.

FIG. 2 shows an embodiment of the invention via which an operator-neutral mobile device can establish a bootstrapping bearer service or session (also referred to simply as a "bearer"). The architecture 200 in FIG. 2 is a functional architecture of a 3GPP network and contains both third generation (3G) and fourth generation (4G) components. As shown, the architecture includes a UE 202, an E-UTRAN (Evolved UMTS (Universal Mobile Telecommunications System) Terrestrial Radio Access Network) eNodeB 204, a serving gateway node 206, a PDN (Packet Data Network) gateway node 208, network operator IP (Internet Protocol) services 210, a PCRF (Policy and Charging Rules Function) node 212, an MME (Mobility Management Entity) 214, an SGSN (Serving GPRS (General Packet Radio Service) Support Node) 216, an HSS (Home Subscriber Server) 218, UTRAN 220, and GERAN (GSM (Global System for Mobile Communications) Edge Radio Access Network) 222. Those of ordinary skill in the art will realize the typical functions and interactions between these components. Also, it is to be understood that other network components may be present in the architecture, but are not shown for the sake of clarity.

Several known interfaces between the components shown in FIG. 2 are provided in the architecture 200. S1-MME is a reference point for the control plane protocol between E-UTRAN eNodeB 204 and MME 214. S1-U is a reference point between E-UTRAN eNodeB 204 and serving gateway 206 for the per bearer user plane tunneling and inter eNodeB path switching during handover. S3 enables user and bearer information exchange for inter 3GPP access network mobility in idle and/or active state. This reference point can be used intra-PLMN or inter-PLMN (e.g., in the case of inter-PLMN HO (handover)). S4 provides related control and mobility support between the GPRS core and the 3GPP anchor function of the serving gateway 206. In addition, if a direct tunnel is not established, S4 provides the user plane tunneling. S5 provides user plane tunneling and tunnel management between serving gateway 206 and PDN gateway 208. S5 is used for serving gateway (206) relocation due to UE mobility and if the serving gateway needs to connect to a non-collocated PDN gateway for the required PDN connectivity. S6a enables transfer of subscription and authentication data for authenticating/authorizing user access to the evolved system (diameter-base interface) between MME 214 and HSS 218. Gx provides transfer of quality of service (QoS) policy and charging rules from PCRF node 212 to a policy and charging enforcement function (PCEF) in the PDN gateway 208. S10 is a reference point between MMEs for MME relocation and MME-to-MME information transfer. This reference point can be used intra-PLMN or inter-PLMN (e.g., in the case of inter-PLMN HO). S11 is a reference point between MME 214 and serving gateway 206. S12 is a reference point between UTRAN 220 and serving gateway 206 for user plane tunneling when a direct tunnel is established. It is based on the Iu-u/Gn-u reference point using the GTP-U protocol as defined between SGSN 216 and UTRAN 220 or respectively between SGSN 216 and GGSN (Gateway GPRS Support Node, not expressly shown). Usage of S12 can be an operator configuration option. The Rx reference point resides between the AF (application function, in this case, operator IP services 210) and PCRF 212.

In certain embodiments, the following protocol assumptions can be made: (1) S1-U is based on the GTP-U protocol (GPRS tunneling protocol); (2) S3 is based on the GTP protocol; (3) S4 is based on the GTP protocol; (4) S5 is based on the GTP protocol (PMIP variant of S5 is described in TS 23.402); (5) S8 is based on GTP protocol (PMIP variant of S8 is described in TS 23.402); and (6) S3, S4, S5, S8, S10 and S11 interfaces are designed to manage EPS (Evolved Packet System) bearers.

The interface relevant, in this embodiment of FIG. 2, for the network operator-neutral mobile device provisioning application is SGi which is basically an IP interface to the APN (Access Point Name) that contains the bootstrapping functionality. However, to access this interface, the UE 202 needs to establish the bearer service to the PDN gateway 208 without providing legitimate subscription credentials. In accordance with embodiments of the invention, this is accomplished by using the procedure that adapts the emergency calling function described above (where the session is "hotwired" exclusively to the emergency call center in a limited service state or LSS). In the provisioning case implemented in accordance with embodiments of the invention, the session is "hotwired" to a bootstrapping and provisioning server (such as subscription manager (SM) 116 shown and described above in the context of FIG. 1). This is described in detail below in the context of FIG. 3.

It is realized that UEs in the limited service state can determine that a cell supports a bootstrap service for loading subscription profile(s) and/or provisioning over E-UTRAN from a broadcast indicator in the access stratum (AS) layer of the network. For example, AS messages and data are exchanged between UE 202 and eNodeB 204, and NAS (non-access stratum) messages are exchanged between UE 202 and MME 214.

For UEs that are bootstrap attached, the evolved packet system (EPS) security context is not set up on the UE. The UE can set the radio resource control (RRC) establishment cause to bootstrap (this indicator can be defined by, e.g., the network provider) when it requests an RRC connection in relation to an emergency session. When a given PLMN supports bootstrap services, all MMEs in that PLMN can have the same capability to support bootstrap bearer services to ensure the ability of any operator-neutral UE (with eSIM/eUICC) to bootstrap security and to load its initial subscription profile(s) and/or provisioning information.

To provide network connectivity for bootstrapping bearer services, the MME is configured with MME bootstrapping bearer configuration data that is applicable to all bootstrapping bearer services that are established by an MME on UE request. The MME bootstrapping bearer configuration data contains the bootstrapping APN which is used to derive a PDN gateway, or the MME bootstrapping bearer configuration data may also contain the statically configured PDN gateway for the bootstrapping APN.

UEs that are in limited service state (for example, as specified in 3GPP TS 23.122), can initiate the attach procedure by indicating that the attach procedure is to receive emergency services. Also UEs that had attached for normal services and do not have emergency bearers established and are camped on a cell in limited service state (e.g., because of restricted tracking area, or not allowed in the case of a closed subscriber group or CSG) can initiate this attach procedure, indicating that the attach procedure is to receive emergency services. The network supporting emergency services for UEs in a limited service state provides emergency bearer services to these UEs, regardless whether the UE can be authenticated, has roaming or mobility restrictions or a valid subscription, depending on local regulation. The UEs in limited service state can determine that the cell supports emergency services over E-UTRAN from a broadcast indicator in the AS layer.

Figure 3:
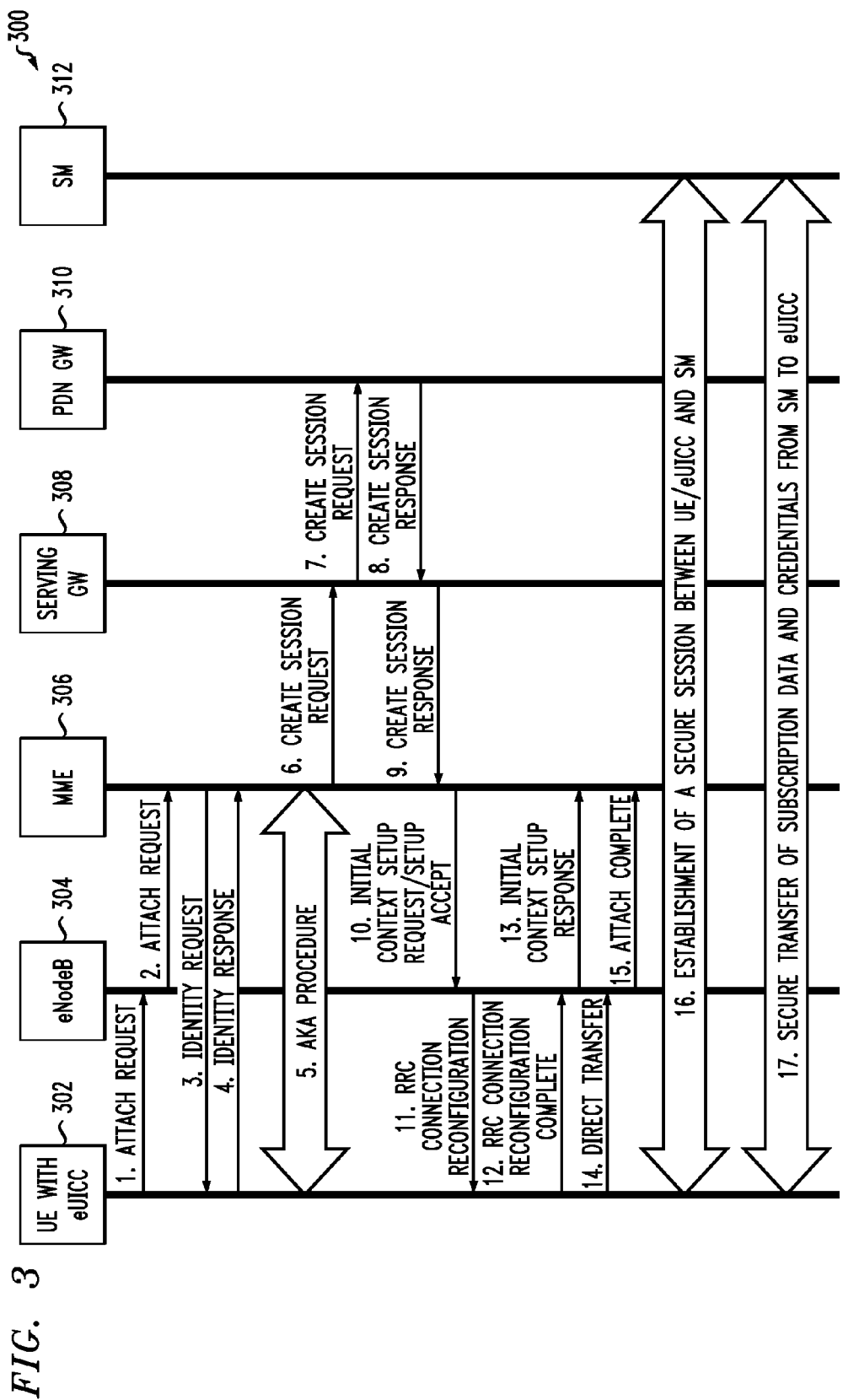
FIG. 3 is a diagram illustrating a methodology for provisioning network-operator-neutral mobile devices, according to an embodiment of the invention.

FIG. 3 shows a protocol for establishing a dedicated provisioning bearer according to an embodiment of the invention. As shown, the example includes UE 302 (with network operator-neutral eSIM/eUICC), eNodeB 304, MME 306, serving gateway (GW) 308, PDN GW 310, and subscription manager (SM) 312.

In step 1, UE 302 initiates the attach procedure by the transmission to eNodeB 304 of an Attach Request. The Attach Type indicates whether it is a "Provisioning Attach." For a Provisioning Attach, UE 302 sets both the Attach Type and the Request Type to "Provisioning" and the IMSI is included if the UE does not have a valid GUTI (Globally Unique Temporary Identifier) or a valid P-TMSI (Packet-Temporary Mobile Station Identity) available. The IMEI (International Mobile Equipment Identity) can be included when the UE has no IMSI, no valid GUTI and no valid P-TMSI.

In step 2, eNodeB 304 selects MME 306 and forwards the Attach Request message to MME 306. If MME 306 is not configured to support Provisioning Attach, the MME can reject any Attach Request that indicates Attach Type "Provisioning."

In step 3, if UE 302 is unknown to MME 306, MME 306 sends an Identity Request to UE 302 to request the IMSI.

In step 4, UE 302 responds with an Identity Response (IMSI) if it is available.

For a Provisioning Attach, if UE 302 identifies itself with a temporary identity that is not known to MME 306, MME 306 immediately requests the IMSI from UE 302. If UE 302 identifies itself with IMEI, the IMSI request can be skipped.

In step 5, an Authentication and Key Agreement (AKA) session between UE 302 and the network (MME 306) is established. This step is only possible if UE 302 responded with its IMSI in step 4, and can be skipped otherwise. If the result of the AKA is positive, then MME 306 is not in the LSS for the purposes of this message exchange. If the AKA result is negative, then UE 302 is presumed to be in the LSS for the purposes of this message exchange. This is done to enable UEs with partially-loaded or corrupted eUICC content to connect to the provisioning system and re-load the subscription data.

In step 6, for a Provisioning Attach, MME 306 applies the parameters from the MME Provisioning Configuration Data for the provisioning bearer establishment performed in this step, and any potentially stored IMSI related subscription data can be ignored by the MME. For a Provisioning Attach, MME 306 uses its PDN GW Selection function to select a PDN GW (e.g., 310 in this example). For provisioning attached UEs, an IMSI is included if available and if the IMSI cannot be authenticated, then the IMSI can be marked as unauthenticated.

In step 7, Serving GW 308 creates a new entry in its EPS bearer table and sends a Create Session Request message to PDN GW 310. For provisioning attached UEs, an IMSI is included if available and if the IMSI cannot be authenticated then the IMSI can be marked as unauthenticated.

In step 8, PDN GW 310 returns a Create Session Response message to Serving GW 308.

As shown in step 9, Serving GW 308 returns a Create Session Response message to MME 306. The access point name APN restriction can be set to Provisioning APN. APN identifies an IP PDN with which a mobile data user wants to communicate. In addition to identifying a PDN, an APN may also be used to define the type of service.

In step 10, if an APN Restriction is received, then MME 306 stores the APN restriction value for the Bearer Context. For a provisioning attach, MME 306 determines the UE-AMBR to be used by eNodeB 304 from the APN aggregate maximum bit rate (AMBR) received from Serving GW 308. Note that each APN is associated with an Aggregate Maximum Bit Rate (APN AMBR). Each UE is associated with a UE Aggregate Maximum Bit Rate (UE AMBR). AMBR provides limitation on the use of the network resources. The new MME sends an Attach Accept with the Provisioning Service Support indicator message to the eNodeB. For a Provisioning attached UE, i.e., for UEs that have only provisioning EPS bearers established, there is no AS security context information included in the Si control messages and there is no NAS level security when the UE cannot be authenticated. The Provisioning Service Support indicator informs the UE that Provisioning bearer services are supported, i.e., the UE is allowed to request PDN connectivity for provisioning services.

In step 11, eNodeB 304 sends an RRC Connection Reconfiguration message including the EPS Radio Bearer Identity to UE 302, and the Attach Accept message is sent along to UE 302. The APN is provided to UE 302 to notify it of the APN for which the activated default bearer is associated.

In step 12, UE 302 sends an RRC Connection Reconfiguration Complete message to eNodeB 304.

In step 13, eNodeB 304 sends the Initial Context Response message to MME 306. This Initial Context Response message can includes the GTP (GPRS Tunneling Protocol) tunnel endpoint (TEID) of eNodeB 304 and the address of eNodeB 304 used for downlink traffic on the S1_U reference point.

In step 14, UE 302 sends a Direct Transfer message to eNodeB 304, which includes the Attach Complete message.

In step 15, eNodeB 304 forwards the Attach Complete message to MME 306 in an Uplink NAS Transport message. Once UE 302 has obtained a PDN Address, the UE then sends uplink packets towards eNodeB 304 which are then tunneled to Serving GW 308 and PDN GW 310.

In step 16, eSIM/eUICC of UE 302 establishes a secure session (i.e., a dedicated provisioning bearer) with subscription manager (SM) 312.

In step 17, SM 312 downloads subscription data and authentication credentials to the eSIM/eUICC of UE 302.

FIG. 4 illustrates a computing architecture of a communication network 400 suitable for implementing a network operator-neutral mobile device provisioning methodology, according to one or more embodiments of the invention.

As shown, computing device 410 (e.g., corresponding to a mobile device), computing device 420 (e.g., corresponding to a service provider network element), and computing device 430 (e.g., corresponding to a subscription manager) are operatively coupled via communication network medium 440. The network medium may be any network medium across which the computing devices are operable to communicate. By way of example, the network medium can be any medium that is part of the World Wide Web. However, embodiments of the invention are not limited to a particular type of network medium.

Note that mobile device 410 may represent a mobile device shown in FIGS. 1-3, e.g., M2M device 108, UE 202 or UE 302. Network element 420 may represent one or more of the components shown in FIGS. 1-3, e.g., eNodeB, Serving GW, PDN GW, MME, etc. Further, subscription manager 430 may represent a subscription manager shown in FIG. 1 or 3, e.g., SM 116 or SM 312.

As would be readily apparent to one of ordinary skill in the art, the servers, clients, components, network elements and other computing devices may be implemented as programmed computers operating under control of computer program code. The computer program code would be stored in a non-transitory computer (or processor or machine) readable storage medium (e.g., a memory) and the code would be executed by a processor of the computer. Given this disclosure of various illustrative embodiments of the invention, one ordinarily skilled in the art could readily produce appropriate computer program code in order to implement the protocols described herein.

Nonetheless, FIG. 4 generally illustrates an exemplary architecture for each device communicating over the network medium. As shown, mobile device 410 comprises I/O devices 412, processor 414, and memory 416. Network element 420 comprises I/O devices 422, processor 424, and memory 426. Subscription manager 430 comprises I/O devices 432, processor 434, and memory 436.

It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., computer display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU. That is, each computing device (410, 420, and 430) shown in FIG. 4 may be individually programmed to perform their respective steps of the methodologies and protocols depicted in FIGS. 1 through 3.

Advantageously, as explained above, illustrative embodiments of the invention allow the use of operator-neutral eSIMs/eUICCs, allowing them to be customizable after being deployed. This solution allows devices produced with eSIMs/eUICCs to be produced at lower costs. This solution could be standardized within 3GPP standards groups, at least as an optional extension.

The aspects described above and other aspects of the subject matter described herein are illustrated by way of example and not limited in the accompanying figures in which like reference numerals indicate similar elements.

Embodiments of the inventions may be implemented in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The description and drawings merely illustrate embodiments of the invention. It will thus be appreciated that those skilled in the art will be able to devise various arrangements that, although not explicitly described or shown herein, embody principles of the invention and are included within its spirit and scope. Furthermore, all examples recited herein are principally intended expressly to be only for pedagogical purposes to aid the reader in understanding embodiments of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including," "includes," "having," "has," "with," or variants thereof, are used in either the detailed description and the claims, such terms are intended to be inclusive in a manner similar to the term "comprising." As used herein, the term "one or more of" with respect to a listing of items such as, for example, A and B, means A alone, B alone, or A and B. As used herein, the term "and/or" with respect to a listing of items such as, for example, A and/or B, means A alone, B alone, or A and B. Those skilled in the art will recognize that these and other variations are possible within the spirit and scope as defined in the following claims and their equivalents.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
    a mobile device that is network operator neutral, defining a network operator neutral mobile device, attaching to a first cellular operator network;
    the network operator neutral mobile device establishing a provisioning bearer in the first cellular operator network in the absence of information stored on the network operator neutral mobile device specifying a given cellular network operator with which the network operator neutral mobile device will operate; and
    the network operator neutral mobile device being provisioned, via the provisioning bearer, with information specifying the given cellular network operator with which the network operator neutral mobile device will operate;
    wherein attaching the network operator neutral mobile device comprises the network operator neutral mobile device:
        obtaining initial connectivity in a limited service state; and
        initiating an attach procedure in the limited service state with an indication that the attach procedure is to bootstrap service for at least one of:
            a) loading one or more subscription profiles; and
            b) provisioning the network operator neutral mobile device.

2. The method of claim 1, wherein the step of establishing the provisioning bearer further comprises:
    the network operator neutral mobile device establishing a secure session using the provisioning bearer; and
    the network operator neutral mobile device being provisioned over the secure provisioning bearer.

3. The method of claim 1, wherein the step of attaching the network operator neutral mobile device further comprises sending identity information for the network operator neutral mobile device.

4. The method of claim 3, wherein the identity information comprises at least one of an international mobile subscriber identity (IMSI), an international mobile equipment identity (IMEI), and an (e)UICC ID.

5. The method of claim 1, further comprising the network operator neutral mobile device being provisioned via the provisioning bearer for a second cellular operator network.

6. The method of claim 1, wherein the step of attaching the network operator neutral mobile device further comprises sending a provisioning indicator from the network operator neutral mobile device.

7. The method of claim 1, wherein the step of attaching the network operator neutral mobile device further comprises receiving at least one service manager location identification.

8. The method of claim 1, wherein the network operator neutral mobile device comprises a subscriber identification module that is missing at least part of a subscription profile.

9. An article of manufacture comprising a non-transitory processor-readable storage medium storing one or more software programs which when executed by a processor perform the steps of the method of claim 1.

10. An apparatus, comprising:
    a memory associated with a mobile device that is network operator neutral, defining a network operator neutral mobile device; and
    a processor device associated with the network operator neutral mobile device coupled to the memory and configured to:
        attach the network operator neutral mobile device to a first cellular operator network;
        assist the network operator neutral mobile device in establishment of a provisioning bearer in the first cellular operator network in the absence of information stored on the memory of the network operator neutral device specifying a given cellular network operator with which the network operator neutral device will operate; and the network operator neutral mobile device being provisioned, via the provisioning bearer, with information specifying the given cellular network operator with which the network operator neutral mobile device will operate;

wherein attaching the network operator neutral mobile device comprises the network operator neutral mobile device:

obtaining initial connectivity in a limited service state; and initiating an attach procedure in the limited service state with an indication that the attach procedure is to bootstrap service for at least one of:
a) loading one or more subscription profiles; and
b) provisioning the network operator neutral mobile device.

11. The apparatus of claim 10, wherein establishment of the provisioning bearer further comprises:

the network operator neutral mobile device establishing a secure session using the provisioning bearer; and the network operator neutral mobile device being provisioned over the secure provisioning bearer.

12. The apparatus of claim 10, wherein attaching the network operator neutral mobile device further comprises sending identity information for the network operator neutral mobile device.

13. The apparatus of claim 12, wherein the identity information comprises at least one of an international mobile subscriber identity (IMSI), an international mobile equipment identity (IMEI), and an (e)UICC ID.

14. The apparatus of claim 10, wherein the processor device is further configured to assist the network operator neutral mobile device in being provisioned for a second cellular operator network via the provisioning bearer.

15. The apparatus of claim 10, wherein attaching the network operator neutral mobile device further comprises sending a provisioning indicator from the network operator neutral mobile device.

16. The apparatus of claim 10, wherein attaching the network operator neutral mobile device further comprises receiving at least one service manager location identification.

17. The apparatus of claim 10, wherein the network operator neutral mobile device comprises a subscriber identification module that is missing at least part of a subscription profile.

18. A system comprising:

a mobility management entity configured to attach a network operator neutral mobile device to a first cellular network; and a service management entity configured to provision the attached mobile device through a secure bearer in the absence of information stored on the network operator neutral device specifying a given cellular network operator with which the network operator neutral device will operate;

wherein the service management entity is configured to provision the attached mobile device with information specifying the given cellular network operator with which the network operator neutral mobile device will operate;

wherein attaching the network operator neutral mobile device comprises the network operator neutral mobile device:

obtaining initial connectivity in a limited service state; and initiating an attach procedure in the limited service state with an indication that the attach procedure is to bootstrap service for at least one of:
a) loading one or more subscription profiles; and
b) provisioning the network operator neutral mobile device.

19. The system of claim 18, wherein the service management entity is further configured to provision the attached mobile device for a second cellular network.

20. The system of claim 18, wherein the mobility management entity is further configured to support provisioning a network operator neutral mobile device.

21. The method of claim 1, wherein the network operator neutral mobile device establishes said provisioning bearer without an initial user subscriber profile specifying the given cellular network operator with which the network operator neutral mobile device will operate.

* * * * *